(12) United States Patent  
Beelen-Hendrikx

(10) Patent No.: US 11,893,440 B2  
(45) Date of Patent: Feb. 6, 2024

(54) CARD-TYPE SUBSTRATE HAVING BIOMETRIC FUNCTIONALITY AND A METHOD OF FORMING THE SAME

(71) Applicant: LINXENS HOLDING, Mantes-la-Jolie (FR)

(72) Inventor: Caroline Catharina Maria Beelen-Hendrikx, Weert (NL)

(73) Assignee: LINXENS HOLDING, Mantes-la-Jolie (FR)

( * ) Notice: Subject to any disclaimer, the term of this patent is extended or adjusted under 35 U.S.C. 154(b) by 0 days.

(21) Appl. No.: 17/787,166

(22) PCT Filed: Dec. 20, 2019

(86) PCT No.: PCT/IB2019/001460

§ 371 (c)(1),
(2) Date: Jun. 17, 2022

(87) PCT Pub. No.: WO2021/123862

PCT Pub. Date: Jun. 24, 2021

(65) Prior Publication Data

US 2023/0017273 A1    Jan. 19, 2023

(51) Int. Cl.
*G06K 19/073* (2006.01)

(52) U.S. Cl.
CPC ............................. *G06K 19/07354* (2013.01)

(58) Field of Classification Search
CPC ....... G06K 19/07354; G06K 19/07747; G06K 19/0718

See application file for complete search history.

(56) References Cited

U.S. PATENT DOCUMENTS

| | | | |
|---|---|---|---|
| 2005/0139685 A1* | 6/2005 | Kozlay | G06K 19/07354 235/492 |
| 2018/0330138 A1* | 11/2018 | Suwald | G06V 40/1306 |
| 2018/0365476 A1 | 12/2018 | Ogirko et al. | |
| 2019/0019005 A1 | 1/2019 | Pompeani et al. | |

FOREIGN PATENT DOCUMENTS

EP    3401835 A1    11/2018

OTHER PUBLICATIONS

International Search Report and Written Opinion for related International Application No. PCT/IB2019/001460, dated Sep. 1, 2020, 11 pages.

* cited by examiner

*Primary Examiner* — Seung H Lee
(74) *Attorney, Agent, or Firm* — DITTHAVONG, STEINER & MLOTKOWSKI

(57) ABSTRACT

A smartcard receives biometric capabilities by incorporating a biometric sensor chip based on a "dual" flip chip bonding technique. In particular embodiments, the sensor chip may be incorporated into the card-type substrate after having completed any high temperature process steps required for laminating the various foil layers of the card-type substrate.

22 Claims, 1 Drawing Sheet

CARD-TYPE SUBSTRATE HAVING BIOMETRIC FUNCTIONALITY AND A METHOD OF FORMING THE SAME

RELATED APPLICATION

This application claims priority from International Application No. PCT/IB2019/001460, entitled "A Card-Type Substrate Having Biometric Functionality and a Method of Forming the Same", filed on Dec. 20, 2019, the contents of which are hereby incorporated herein in its entirety by this reference.

FIELD OF THE PRESENTATION

Generally, the present invention relates to cart-type substrates, i.e. devices having the configuration of card, such as a smartcard, with additional biometric functionality that may be imparted, for instance, by a sensor providing functions for evaluating biometric features, such as evaluating fingerprints, and the like.

BACKGROUND ART

In many technical fields, there is an ongoing trend of using sensors that may detect or evaluate biometric features, such as detecting fingerprints, characteristics of an iris, and the like, in order to increase overall security and reliability when requesting access to information and/or to specific locations, and the like. As is well known, one aspect in this context is the usage of card-type devices or substrates, which are frequently used for accessing sensitive information, bank accounts, initiating financial transactions, and the like. In other cases, the card-type substrate or device is part of a security document in the form of a datapage or the like, which provides sensitive information for identification purposes, and the like. Although the usage of such card-type substrates is typically associated with certain security features, such as a secret identification number, and the like, it is highly desirable to incorporate additional or alternative security features into card-type substrates, for instance, by evaluating biometric features of a user.

Therefore, it has become standard practice to also incorporate fingerprint sensors, as are typically used in computers, or other types of appliances, doors, and the like, so as to avoid application of secret identification numbers or other keywords, or provide additional information unique for a user based on biometric features for a card-type substrate, thereby increasing its level of security.

When implementing a sensor for identifying biometric features, such as a fingerprint sensor, and the like, in a smartcard the sensor and/or any control circuitry associated therewith has to be electrically connected to the rest of the smartcard, for instance for enabling signal exchange and/or power supply, thereby requiring an appropriate contact regime. To this end, in some conventional approaches a fingerprint sensor is incorporated into the stack of laminated foil layers by attaching the sensor to a pre-form of the smartcard, establishing the electrical connections between the sensor chip and the remaining pre-form, for instance by using wire bonding techniques, and thereafter placing additional layers on top of the sensor while exposing a certain portion thereof by a respective window. Consequently, the sensor chip has to withstand a plurality of process steps including lamination processes for completing the smartcard, in which heat and pressure are applied to the layer stack, thereby inherently contributing to the risk of generating damage in the sensor chip and/or the corresponding electrical connections.

In still other conventional approaches the sensor chip is packaged so as to impart superior mechanical robustness to the sensor chip and thereafter the package including the sensor chip is incorporated into the stack of foil layers at any appropriate manufacturing stage, wherein electrical connection between the package and the remaining portion of the smartcard may be established by wire bonding. Due to the superior robustness of the package, the risk of damage of the sensor chip is significantly reduced upon incorporating the packaged sensor chip into the smartcard. On the other hand, using a package for the sensor may contribute to increased overall dimensions of the packaged sensor chip, which may restrict flexibility in incorporating a corresponding biometric sensor into a card-type substrate, since here typically specific requirements in particular with respect to the overall thickness of the card-type substrate have to be met.

In view of the situation described above it is therefore an object of the present invention to enable incorporation of biometric functionality into a card-type substrate while avoiding or at least reducing one or more of the problems identified above.

DISCLOSURE OF INVENTION

In view of the situation described above the present invention is generally based on the concept that biometric functionality may be incorporated into a card-type substrate, such as a payment card, any type of smartcard, a datapage of a security document, and the like, by using a biometric sensor chip that may be "pre-conditioned" so as to allow efficient attachment to the card-type substrate on the basis of direct electrical and mechanical connection to card-type substrate. That is, since most of the conventional solutions are based on package in package type configuration, the present invention is directed to a solution including a direct chip attach that may provide for reduced costs and reduced thickness. To this end, a type of "flip chip type bonding technique" may be applied to the "pre-conditioned" sensor chip when being connected to the card-type substrate, while also a "flip chip type bonding technique" may be used for "pre-conditioning" the sensor chip by attaching the same to an appropriate flexible carrier material. In this manner, the biometric functionality may be incorporated into the card-type substrate at any appropriate manufacturing stage, for instance at a very late stage by a "dual" flip chip bonding, while the direct electrical and mechanical connection to the card-type substrate may nevertheless ensure a highly robust overall configuration for the card-type substrate including the biometric functionality.

In one aspect of the present invention, the above-specified technical object is solved by a method of adding biometric functionality to a card-type substrate. The method includes providing a biometric chip to have a first surface and an opposing second surface, wherein the first surface having formed thereon chip contact elements. The method further includes connecting the biometric chip to a chip receiving substrate by gluing and/or soldering the chip contact elements to a corresponding first set of substrate contact elements formed on a contact surface of the chip receiving substrate. Additionally, the method includes connecting the chip receiving substrate to the card-type substrate by gluing and/or soldering a second set of substrate contact elements of the chip receiving substrate to card contact elements of the card-type substrate.

According to this aspect of the present invention, a biometric chip is connected with its respective chip contact elements to appropriately designed and positioned first contact elements of the chip receiving substrate by a direct mechanical and electrical connection, i.e. by gluing and/or soldering techniques. Therefore, an effective process may be established, in which the corresponding connections between the individual contact elements may be established in parallel. Similarly, after having attached the biometric chip to the chip receiving substrate, thereby providing for the "pre-conditioned" state of the biometric chip, the connection between the chip receiving substrate and the remaining portion of the card-type substrate is also established on the basis of a direct connection, thereby also contributing to reduced process time and increased process reliability upon establishing the connection of the sensor chip to the remaining portion of the card-type substrate.

In one illustrative embodiment the chip, receiving substrate is provided with an opening that exposes at least a portion of the first surface of the biometric chip after being connected to the chip receiving substrate. Typically, a biometric chip may comprise at least one "active" surface portion, for instance for mechanically and/or optically and/or electrically interact with the user to evaluate respective biometric features that may be considered to be unique for a specific user. In this case, the opening provided in chip receiving substrate allows interaction with the first surface, i.e., the respective active portion or interaction zone thereof, when a respective material of the remaining portion of the chip receiving substrate is considered inappropriate for enabling interaction between the sensor surface and user.

In one illustrative embodiment, a fill material is filled into the opening so as to cover at least a portion of the first surface of the biometric chip. Consequently, by using the fill material that covers at least a portion of the first surface, the respective sensor characteristics may specifically be adapted to the requirements under consideration and/or overall robustness of the exposed portion of the surface may be enhanced, while avoiding undue reduction of interaction sensitivity of the respective surface portion. That is, by providing the opening and filling at least a portion thereof with the fill material a high degree of flexibility in adjusting the overall characteristics of the biometric functionality may be achieved. For example, if optical interaction with the biometric sensor chip is required, the fill material may be selected to meet respective optical characteristics, for instance, in terms of index of refraction, transmittance, reflectivity, and the like, while at the same time or alternatively dielectric requirements may be met. In addition or alternatively to adapting the sensitivity of the chip to respective biometric features overall robustness with respect to environmental influences may be addressed by providing the fill material. Additionally or alternatively to the above specified aspects the fill material may provide for superior mechanical robustness, for example, by covering the entire exposed portion of the first surface of the biometric chip. In some cases, the fill material may also be applied to meet specific requirements with respect to surface characteristics of the card-type substrate. For example, when a substantially even or flat surface is desired, the fill material may be applied and processed such that overall a flat surface is obtained. In other cases, it may be desirable to provide for a certain step within the overall surface of the card-type substrate, for instance for mechanically indicating to the user the presence of the sensor window, and thus a corresponding degree of underfilling or overfilling may be provided so as to obtain the stepped surface configuration. The fill material may also have an aesthetic effect, for instance, to change colour, and the like. The same holds true for a "fill" material that is provided as a coating, when no opening is present.

In other illustrative embodiments a mask layer is formed on the chip receiving substrate, wherein the mask layer corresponds in lateral size and position substantially to a lateral size and position of the biometric chip. In this case, the chip receiving substrate having attached thereto the biometric chip may be provided without any opening so that the final surface characteristics of a respective "interaction zone" of the biometric chip may be defined and adapted by means of substrate material in combination with the mask layer. For example, optical, mechanical, electrical or dielectric characteristics of the "interaction zone" of the chip receiving substrate may appropriately be adjusted by means of the mask layer.

Furthermore, as also discussed above in the context of the fill material the mask layer may be applied to specifically address the characteristics required for a surface material for achieving appropriate interaction with the biometric chip provided "below" the chip receiving substrate. For example, the mask layer may provide for adapted optical and/or electrical characteristics of the respective interaction zone. Furthermore, the mask layer may provide for a stepped surface configuration, which may result in superior tactile guidance for the user, when touching the interaction zone is required.

In one illustrative embodiment, the method further includes the step of connecting a discrete functional component, such as an electronic component, to the chip receiving substrate prior to or simultaneously with connecting the chip receiving substrate to the card-type substrate. In this case, any additional components, such as capacitors, inductors, and the like, which may typically have to be provided outside of and in addition to the biometric chip may be connected to the chip receiving substrate, thereby finally reliably be connected to the card-type substrate.

To this end, in some illustrative embodiments a solder material and/or a conductive adhesive material for the discrete functional component and for the second set of substrate contacts is formed in the same process sequence. That is, the same process is used for forming the material for electrically and mechanically connecting the discrete functional component to the chip receiving substrate and the second set of substrate contacts to the card-type substrates. That is, the solder material and/or the conductive adhesive material for connecting the discrete functional component to the chip receiving substrate and the solder material and/or conductive adhesive material for the second set of substrate contacts, which will be used for connecting the chip receiving substrate to the card-type substrate, are applied during the same process step, thereby significantly reducing overall process complexity. Similarly, further additional discrete components, electronic components, opto-electronic components, mechanical components, and the like may be placed on the chip receiving substrate together with the at least one discrete functional component, thereby enabling a configuration as required for the desired biometric functionality of the card-type substrate without adding process complexity.

In one illustrative embodiment, any thermal stress and mechanical stress inducing processes for processing the card-type substrate are performed prior to connecting the chip receiving substrate to the card-type substrate.

In this context it is to be noted that the term "thermal stress and mechanical stress inducing processes" is to include any lamination processes, in which foil layers of the card-type substrate are connected by applying heat and pressure, as is well known in the field of manufacturing laminated foil structures for smartcards, payment cards, security datapages, and the like. Consequently, according to these illustrative embodiments, the chip receiving substrate and thus the biometric chip and the respective electrical and mechanical connections to the card-type substrate will not experience the stress that is typically involved in performing a lamination process. In particular, process temperature applied during a respective lamination process or process sequence may be selected independently of the melting temperature of any solder material used for connecting the biometric chip to the chip receiving substrate and for connecting the chip receiving substrate to the card-type substrate. That is, in particular the process temperature used during the lamination process may exceed the melting temperature of any solder material used for connecting the biometric chip to the card-type substrate.

According to a further aspect, the above-referenced technical object is solved by a method that includes the step of forming a card-type substrate by stacking and laminating a plurality of materials, wherein the card-type substrate includes a plurality of contact elements. The method additionally includes the step of forming a cavity in the card-type substrate to expose at least some of the plurality of contact elements and thereby finalizing the card-type substrate. Additionally, the method includes the step of positioning a chip within the cavity, wherein the chip has biometric functionality. Additionally, the method includes a step of electrically connecting the chip to at least some of the plurality of contact elements.

According to this aspect the chip providing the biometric functionality is connected to the card-type substrate at a very late manufacturing stage, i.e., after having performed any process steps required for laminating any material layers of the card-type substrate. Consequently, the biometric chip may electrically be connected to the card-type substrate based on any appropriate technique without being affected by process conditions that are encountered during the lamination process or process sequence.

In some illustrative embodiments, the electrical connecting of the chip to the at least some of the plurality of contact elements includes the step of electrically and mechanically connecting chip contact elements formed on a surface of the chip to a first set of contact elements that is formed on a surface of a chip receiving substrate, wherein the electrical and mechanical connection is established by soldering and/or gluing Therefore, a robust and reliable electrical and mechanical connection may be established in a late manufacturing stage without being affected by previous process steps.

To this end, in some illustrative embodiments, the electrical and mechanical connection of at least some of the plurality of contact elements of the card-type substrate to the second set of contact elements formed on the surface of the chip receiving substrate is established by soldering and/or gluing. In addition, in this case, a robust and reliable electrical and mechanical connection is established, wherein the respective connections are established in parallel, thereby reducing overall process time.

In one illustrative embodiment, the method includes the step of applying a solder material and/or a glue material to the second set of contact elements and also to one or more additional contact elements formed on the surface of the chip receiving substrate in a same process. That is, the same process step is used and is sufficient for providing the solder material and/or glue material for the second contact elements and for any additional contact elements, which may be provided to enable the connection of at least one discrete functional component on the chip receiving substrate. In this case, a required overall configuration of the chip receiving substrate may be established by using a single process step for applying the required solder material and/or glue material.

In some illustrative embodiments the step of connecting the chip to the at least some of the plurality of contact elements includes the following steps: placing the chip in the cavity so as to adhere to the first set of contact elements of the chip receiving substrate, and positioning the chip receiving substrate so as to adhere, with the second set of contact elements, to the at least some of the plurality of contact elements. Consequently, a "dual" flip chip bonding technique may be applied to firstly attach the biometric chip to the chip receiving substrate and thereafter connect the chip receiving substrate to the card-type substrate, thereby contributing to increased process reliability and reduced overall process complexity.

In some illustrative embodiments, the heat treatment is performed to commonly electrically and mechanically connect the at least one discrete functional component to the chip. That is, a single heat treatment may be applied to reflow a solder material and/or reduce the viscosity of a glue material and cure the same in order to establish the corresponding electrical and mechanical connections for the at least one discrete functional component and the biometric chip.

In this context it should also be noted that in addition to the at least one functional component other components, such as mechanical components, electro-optical components, optical components, and the like may be attached to the chip receiving substrate, which may preferably be accomplished during the same process sequence, during which the at least one functional component is attached to the chip receiving substrate.

In illustrative embodiments, the method includes the step of providing an opening in the surface of the chip receiving substrate, wherein the opening is configured to expose a portion of the surface of the chip after being connected to the chip receiving substrate.

Similarly as discussed above, the opening provides for the possibility of appropriately adapting specific characteristics, such as mechanical characteristics and/or surface configuration and/or optical characteristics and/or electrical characteristics of an interaction zone, for instance by filling in an appropriate fill material that complies with the specific requirements, as discussed above.

In some illustrative embodiments, the method additionally includes the step of forming an underfill material on the surface of the chip receiving substrate prior to or after electrically and mechanically connecting the chip contact elements to the first set of contact elements by soldering. In this manner, any appropriate "underfill material" may be provided on the chip receiving substrate, thereby also allowing the adjustment of the overall mechanical characteristics of the connection between the chip and the chip receiving substrate, even if the respective opening in the chip receiving substrate is not provided.

According to a further aspect the above-referenced technical object is solved by a smartcard that includes a card-type substrate including a cavity and a plurality of card contact elements provided in the cavity. The smartcard additionally includes a biometric chip positioned in the cavity and including a plurality of chip contact elements. Furthermore, the smartcard includes a chip receiving substrate that includes a first set of contact elements and a second set of contact elements formed on a cavity-side surface, wherein the chip receiving substrate covers at least a portion of the cavity. The plurality of chip contact elements is directly mechanically and electrically connected to the first set of contact elements and the plurality of card contact elements is directly electrically and mechanically connected to the second set of contact elements.

Consequently, a certain type of "dual" flip chip bonding configuration is established, thereby contributing to overall robustness and reliability of the smartcard.

In one illustrative embodiment, the smartcard additionally includes one or more discrete functional components positioned in the cavity and electrically and mechanically connected to one or more additional contact elements of the chip receiving substrate. Hence, any desired configuration with respect to mechanical, electrical and/or optical behaviour may be achieved by providing the discrete functional components.

In one illustrative embodiment, the chip receiving substrate includes an opening that is aligned to a sensor surface portion of the biometric chip. As already discussed above, a respective opening provides for the possibility for flexibly adapting the "interaction zone" of the biometric chip to specific use requirements. For example, the sensor surface portion may directly interact with a user, if the sensor surface portion is considered appropriately adapted to a direct contact with the user. In other illustrative embodiments, the sensor surface portion is covered by an appropriate film material formed within the opening, thereby enabling appropriate adaptation of specific characteristics, such as mechanical robustness, optical behaviour, and aesthetic appearance, such as different colors, electrical behaviour, and the like. Moreover, by providing an appropriate for material in addition or alternatively to an adaptation of specific characteristics the overall surface configuration may be appropriately adjusted, for instance by providing a step configuration to provide a mechanical indication for the lateral size and position of the sensor surface portion.

In still other illustrative embodiments, the smartcard includes a mask layer formed on an external surface of the chip-receiving surface, wherein the mask layer corresponds in lateral size and shape to a sensor surface portion of the biometric chip. Consequently, the mask layer may allow appropriate adaptation of the "interaction zone" with respect to any desired characteristics, even if a respective opening and a respective fill material may not be provided.

BRIEF DESCRIPTION OF THE DRAWINGS

Further illustrative embodiments and other aspects of the present invention will be described in more detail in the following specification, while also referring to the accompanying drawings, in which FIGS. 1A and 1B schematically illustrate cross-sectional views of a smartcard including biometric sensor functionality according to illustrative embodiments.

BEST MODE(S) FOR CARRYING OUT THE INVENTION

Figure 1A:
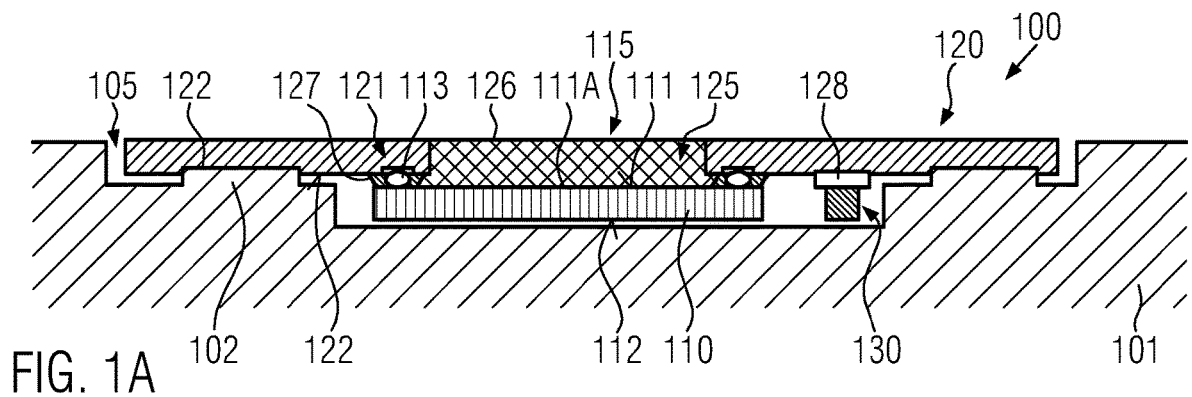

With reference to the accompanying drawings, further illustrative embodiments of the present invention as well as embodiments discussed above will now be described in more detail. It is to be appreciated that various components of the present invention are denoted by the same reference numerals in FIGS. 1 and 2, except fora leading digit 1 or 2, if appropriate, and a respective description of components having the same reference numerals, except for the leading digit 1 and 2, may be omitted. Consequently, it is to be noted that any component described with reference to FIGS. 1A and 1B may also be implemented in any of the embodiments discussed in the context of FIGS. 2A and 2B, even if such components are not explicitly referred to in the respective parts of the description.

FIG. 1A schematically illustrates a cross-sectional view of a smartcard 100 according to illustrative embodiments. It should be appreciated that the term "smartcard" as used herein is to be understood so as to include any type of cards, for instance used as payment card, datapage of a security document, and the like, in which certain electronic components are implemented in order to provide for information storage, information access, information processing and/or signal exchange capabilities. As previously discussed, a typical smartcard, as understood in the above-identified manner, may be provided with biometric sensor functionality, thereby typically requiring the incorporation of biometric sensor chip.

To this end, the smartcard 100 includes a card-type substrate 101 having formed therein a cavity 105, which is appropriately configured to accommodate a biometric chip 110. In the embodiment shown, the biometric chip 110 has a first surface 111 and an opposing second surface 112, wherein the first surface 111 includes chip contact elements 113, which, in the embodiment shown, may be provided in the form of solder bumps. That is, the contact elements 113 may include an appropriate conductive material in combination with a solder material of any appropriate composition. For example, the contact elements 113 may comprise gold, a tin/gold composition, and the like, wherein a typical under bump metallization may include a layer stack composed of TiCuCu. The contact elements 113 may be provided with appropriate lateral distances to comply with the input/output configuration of the chip 110. It should be appreciated that minimum lateral spaces or a typical minimum lateral pitch of the contact elements 113 may depend on the technology node used for forming the chip 110. For example, in accordance with presently available techniques a typical minimum pitch may be about 80 µm. However, other minimum lateral dimensions may be realized when using a different technology node, or when other techniques become available. In the case that bond pads, i.e., the input/output configuration on the chip 110, are not suited for solder bumps, for instance, due to too small size and/or too small lateral spacing, a redistribution layer may be applied on the chip 113. A respective redistribution layer may include a repassivation layer, such as PI or PBO, with openings at the chip contacts, an under bump metallization and a second repassivation layer, such as PI or PBO. This redistribution layer may also increase the reliability of the interconnect system.

If the input/output pads on the chip 110 are too small, but the positioning is appropriate, another option may be the use of a repassivation layer, for instance including a passivation layer, such as PI or PBO, and an under bump metallization. Repassivation may also improve reliability, possibly to a lesser degree as redistribution, but at reduced costs.

The chip 110 is attached to a chip receiving substrate 120, such as a flexible printed circuit board, which may include a first set of contact elements 121 formed and arranged to comply with the shape and arrangement of the contact elements 113 of the chip 110. Furthermore, the chip receiving substrate 120 includes a second set of contact elements 122, which in turn are provided to correspond to respective substrate contact elements 102 formed within the cavity 105 and corresponding to the second set of contact elements 122. That is, the chip receiving substrate 120 includes the first and second sets of contact elements 121 and 122 that are formed on the same surface of the chip receiving substrate 120 that faces the card-type substrate 101. In the embodiment shown, the chip receiving substrate 120 is dimensioned so as to substantially cover the cavity 105, which has a stepped configuration in order to accommodate the biometric chip 110, which in turn is attached to the chip receiving substrate 120, relevant portions of which are attached to the contact elements 102 provided within a first step of the cavity 105.

In illustrative embodiments, one or more functional components 130, such as passive electronic components, optical components, mechanical components, and the like may be attached to the chip receiving substrate 120 by being attached to respective additional contact elements 128 of the substrate 120, while respective contact elements of the functional components 130 are not shown. It should be appreciated that, although only one functional component 130 is illustrated in FIG. 1A, two or more of such components may be provided and may be placed within the cavity 105, as considered appropriate for the overall configuration of the smartcard 100. For example, if a plurality of functional components 130 is to be implemented into the smartcard 100, a symmetric configuration with respect to the chip 110 may be applied. It should be appreciated, however, that a lateral size and shape of the cavity 105, that is, the size and shape according to a top view of the smartcard 100 (not shown), may be selected in accordance with overall design requirements. Typically, the chip 110 may have a rectangle configuration when viewed in a top view and the cavity 105 may be adapted to the basic configuration of the chip 110, while still leaving space for accommodating the one or more additional functional components 130. Thus, in one illustrative embodiment (not shown) the one or more functional components 130 may be arranged so as to obtain a certain degree of symmetry along at least one lateral direction power, preferably, along two independent lateral directions of the smartcard 100.

In the embodiment shown in FIG. 1A an underfill material 127, which may be provided in the form of any appropriate material, such as nonconductive adhesive, and the like, thereby laterally encapsulated the contact elements 113 connected to the first set of contact elements 121. As an alternative a no-flow underfill material may be used, which may be a composition of flux material and underfill material applied prior to placing the chip 110. In this case any flux application is no longer needed.

It should further be appreciated that typically a plurality of conductors may be provided within the chip receiving substrate 120 that electrically connect the first set of contact elements 121 and the additional contact elements 128 to the respective second contact elements 122 in accordance with circuit requirements of the smartcard 100. Typically, respective conductors may be implemented to exhibit a certain degree of flexibility, thereby accounting for a certain degree of flexing or bending that may occur during processing and usage of smartcard 100.

Furthermore, an opening 125 may be formed in the chip receiving substrate 120 to expose a surface portion 111A of the first surface 111. The surface portion 111A may typically represent an interaction zone 115 for interacting with the chip 110. For example, the interaction zone 115 may enable mechanical and/or optical and/or electrical interaction with the chip 110. In the embodiment shown, a fill material 126 may be provided that covers at least a portion of the opening 125. The fill material 126 may have appropriate characteristics in view of enabling interaction with sensor 110, for instance, by adjusting optical characteristics, mechanical characteristics, electrical characteristics, and the like. In the embodiment shown in FIG. 1A, the fill material 126 is provided to form a substantially even our flat surface configuration in combination with the external surface of the chip receiving substrate 120. In other cases, any other desired surface configuration, for instance a stepped configuration, may be formed based on the fill material 126.

A typical process flow for forming the smartcard 100 may include the following steps.

The card-type substrate 101 may be formed on the basis of well-established lamination techniques, i.e., a plurality of foil layers of appropriate composition may be stacked and may be laminated by applying elevated temperature and mechanical pressure in order to establish a connection between the individual foil layers. As is well known, at any appropriate intermediate stage during the formation of the card-type substrate additional components, such as an electronic module, contact elements, an RF (radio frequency) antenna, if RF capabilities are required, and the like, may be implemented on the basis of well-established process techniques. Consequently, during fabricating the card-type substrate 101 the cavity 105 may also be formed, for instance, by providing perspective foil layers with appropriately dimensioned openings formed therein. Additionally, components, such as an electronic module, an antenna, and the like may be incorporated, thereby obtaining the card-type substrate 101 with contact elements 102 that are internally connected to respective components (not shown). Consequently, in some illustrative embodiments, any high-temperature steps that are typically required for laminating a plurality of foil layers have been completed prior to incorporating the sensor chip 110 together with the chip receiving substrate 120 into the cavity 105.

At any appropriate manufacturing stage, the chip receiving substrate 120 may be provided. Thereafter, the second set of contact elements 122 and the additional contact elements 128, if provided, may be treated to receive solder paste thereon, which may be accomplished during the same application process. Next, a flux agent may be dispensed or a corresponding dip process may be performed to apply the flux agent to the solder bumps 113 of the chip 110. Thereafter, the chip 110 and the one or more functional components 130 may be placed on the chip receiving substrate 120. To this end, the substrate 120 may be placed on an appropriate carrier with the surface including the first and second sets of contact elements 121, 122 and the additional contact elements 128 facing to the chip 110. Based on well-known pick and place techniques the additional functional components 130 and the chip 110, possibly in separate process steps, may appropriately be positioned on the chip receiving substrate 120. Thereafter, a heat treatment may be performed to reflow the solder material of the contact elements or solder bumps 113 and the contact elements 121 and 128, thereby obtaining, after a solidification of the solder material, a reliable electrical and mechanical connection. In other cased, the one or more functional components 130 may be glued to the chip receiving substrate 120. Subsequently, the underfill material 127 may be applied, for instance by any appropriate deposition technique, so as to preferably provide the underfill material 127 around the connections formed by the contact elements or solder bumps 113 and the first set of contact elements 121. Next, the fill material 126, if this material has to be provided, may be deposited by any appropriate deposition technique, such as printing, spin-on techniques, and the like, and, if desired, a certain degree of levelling of the opening 125 with respect to the remainder of the surface of the chip receiving substrate 120 may be accomplished. Depending on the deposition process, any excess material of the fill material 126 may be removed by any appropriate process technique. In other embodiments, the underfill material 127 and the fill material may be provided as the same material and/or may be formed in a common process sequence.

After having established a module including the chip 110 and the chip receiving substrate 120 this module may be attached to the card-type substrate 101. In one example, the module composed of the chip 110 and the substrate 120 may have a thickness in the range of 350 to 410 µm, depending on the respective dimensions of the chip 110, the contact elements 113 and the thickness of the substrate 120. Consequently, a configuration of reduced thickness, for instance compared to conventional approaches using a packaged sensor chip, may be accomplished, thereby resulting in superior process ability and increased robustness of the smartcard 100.

Upon placing the module including the chip 110 and the chip receiving substrate 120 within the cavity 105 so as to bring into contact the second set of contact elements 122 and the contact elements 102, a further heat treatment may be performed in order to mechanically and electrically connect the respective corresponding contact elements 122 and 102 to each other. It should be appreciated that the corresponding heat treatment may also result in a certain reflow of previously established connections, such as the connections between the contact elements 113 and 121. During this further heat treatment a mechanical and electrical decoupling of these contact elements may readily be avoided by providing an additional material layer (not shown) within the cavity 105, which may mechanically support the chip 110 and the one or more functional components 130. In other embodiments a different solder material with lower melting point may be used for the chip substrate to card interconnect or the chip substrate to card interconnect may be made by anisotropic glue.

As a result, after solidification of the solder material the contact elements 122 and 102 are connected to each other and the chip 110 is therefore electrically connected to the remaining portion of the card-type substrate 101 by means of the chip receiving substrate 120, wherein the respective electrical and mechanical connections are established by a "dual" flip chip bonding technique.

Figure 1B:
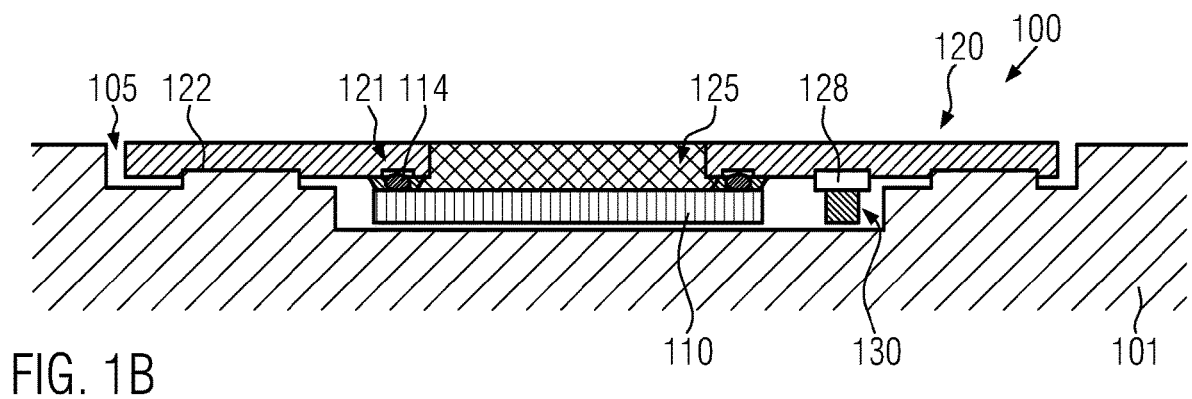

FIG. 1B schematically illustrates a cross-sectional view of the smartcard 100 according to other illustrative embodiments. The smartcard 100 of FIG. 1B has the same configuration as the smartcard 100 of FIG. 1A, except for chip contact elements 114 formed on the biometric chip 110. In the present embodiment, the contact elements 114 may be provided in the form of gold bumps or tin/gold bumps instead of a solder material, such as the solder based contact elements 113 described above with reference to FIG. 1A.

Consequently, upon attaching the chip 110 and the one or more additional functional components 130 to the chip receiving substrate 120, respective solder paste may be applied to the contact elements 122 and contact elements 128 based on any appropriate deposition technique, as also discussed above with reference to FIG. 1A. Thereafter, the one or more functional components 130 may be positioned on the respective contact elements 128 by an appropriate pick and place technique. Subsequently, the module including the substrate 120 and the one or more functional components 130 may be subjected to a heat treatment to reflow the solder material, thereby establishing, upon solidification of the solder material, a reliable mechanical and electrical connection of the components 130 to the substrate 120.

Thereafter, any appropriate anisotropic conductive glue that is conductive in the thickness direction only, or nonconductive adhesive agent may be applied to the substrate 120, for instance by lamination or other dispensing technique, followed by the placing of the chip 110 so as to connect with its bumps 114 to the respective first set of contact elements 121 having applied thereon the respective conductive or nonconductive adhesive agent. Next, a heat treatment may be performed so as to reliably mechanically and electrically connect the bumps 114 to the contacts 121, wherein, if a temperature above the melting temperature of solder material used in the contact elements 122, 128 has to be applied, respective measures for mechanically securing the chip 110 and the functional components 130 may be applied, as discussed above. Thereafter, any underfill material, if solder material is used, and fill material, as also discussed in the context of FIG. 1A, may be applied based on any appropriate techniques. When using glue, an underfill material may not be necessary, since the glue may also act as underfill. In addition, any underfill material and fill material may be provided in a common process sequence, if considered appropriate.

Consequently, also in this case the chip 110 may reliably mechanically and electrically connected to the card-type substrate 101 via a flip chip bonding technique, thereby providing for reduced process complexity while also reducing the required accommodation volume and ensuring a high degree of robustness. Furthermore, since the respective module composed of the substrate 120 and the chip 110 may be mounted after having carried out any high temperature process steps required for forming the card-type substrate 101, respective stresses that are conventionally associated with mounting a biometric sensor to a pre-form of the card-type substrate followed by additional lamination processes, may therefore be avoided.

Figure 2A:
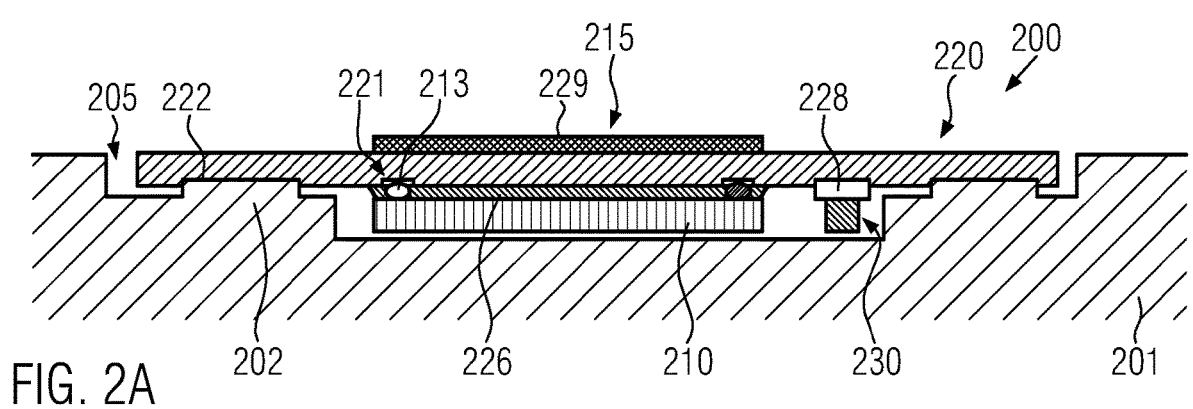
FIGS. 2A and 2B schematically illustrate cross-sectional views of a smartcard, having implemented therein, biometric sensor functionality according to still further illustrative embodiments of the present invention.

FIG. 2A schematically illustrates a cross-sectional view of a smartcard 200 according to further illustrative embodiments. As illustrated, the smartcard 200 includes a card-type substrate 201 having formed therein a cavity 205, in which is mounted a module composed of a biometric sensor chip 210, optional additional functional components 230 and a chip receiving substrate 220. The substrate 220 may include a first set of contact elements 221, a second set of contact elements 222 and additional contact elements 228 similarly as is described in the context of the smartcard 100 of FIGS. 1A and 1B. Furthermore, the sensor chip 210 may include chip contact elements 213 that may be formed of, or may comprise, a solder material, as also described above in the context of the smartcards 100 of FIGS. 1A and 1B. Moreover, in the embodiment shown, the substrate 220 may represent a continuous substrate without having formed therein an opening to expose a surface portion of the chip 210. Rather, an underfill material 226 of any appropriate composition, such as a nonconductive material, may be provided as a buffer layer between the substrate 220 and the chip 210, while also laterally enclosing the contact elements 213.

In some illustrative embodiments, as also shown in FIG. 2A, a mask layer 229 may be provided that corresponds in lateral size and shape basically to the chip 210 or at least a respective surface portion thereof, which may act as an interaction zone 215. The mask layer 229, if provided, may have any appropriate material composition and thickness so as to meet specific requirements, for instance with respect to protecting the interaction zone 215 from migrating material residues, such as solder materials, with respect to adapting electrical cancers or mechanical and/or optical characteristics of the interaction zone 215 to specific requirements, and the like.

The smartcard 200 may be formed based on the following processes.

The card-type substrate 201 may be formed on the basis of any appropriate process techniques so as to incorporate any required components, such as an electronic module, an RF antenna, if required, as well as respective conductors that connect to the contact elements 202. Therefore, in some embodiments, any process steps required for laminating various foil layers of the card-type substrate 201 may be performed without the chip 210 being present in our at the substrate 201. Thereafter, a solder material may be applied to the contact elements 222 and 228 based on any appropriate deposition technique, as also discussed above in the context of the smartcards 100 FIGS. 1A and 1B. Next, a flux agent may be dispensed for the sensor chip 210. Thereafter, the one or more functional components 230 may be placed on the contact elements 228, as also discussed above, while also the chip 210 may be placed to bring the solder based contact elements 213 in contact with the contact elements 221. Subsequently, a heat treatment may be performed to reflow any solder material, thereby obtaining a reliable mechanical and electrical connection between the contact elements 228 and respective contact elements (not shown) of the one or more functional components 230 on the one hand, and between the contact elements 213 and the contact elements 221 on the other hand. Next, if required, the underfill material 226 may be deposited, possibly in combination with a fill material for enclosing the contact elements 213 at the edges of the chip 210, as also discussed above in the context of FIGS. 1A and 1B. Alternatively, no-flow underfill material may be dispensed prior to placing the chip 210, thereby replacing flux and standard underfill material.

It should be appreciated that the mask layer 229 may be formed at any appropriate manufacturing stage, for instance prior to performing the respective reflow process, for instance by depositing any appropriate material and patterning the same by etch techniques, and the like, while in other cases, the mask 229 may be applied on the basis of deposition technique that are spatially selective, such as printing, and the like. By providing the mask layer 229 the interaction zone may appropriately be designed with respect to aesthetic aspects and/or the surface characteristics may be adjusted to comply with the requirements imposed by the specific use case under consideration.

Thereafter, the module composed of the chip 210 and the substrate 220 may be attached to the card-type substrate 201 by placing the module within the cavity 205 and reflowing the solder material of the contact elements 222, is also discussed above in the context of FIGS. 1A and 1B. Additionally, in this case, a mechanical fixation, if required, may be accomplished by providing additional material (not shown) within the cavity 205, or by any other appropriate techniques, such as using solder with lower melting temperature for the chip substrate to card interconnect, or using anisotropic conductive adhesive.

Figure 2B:
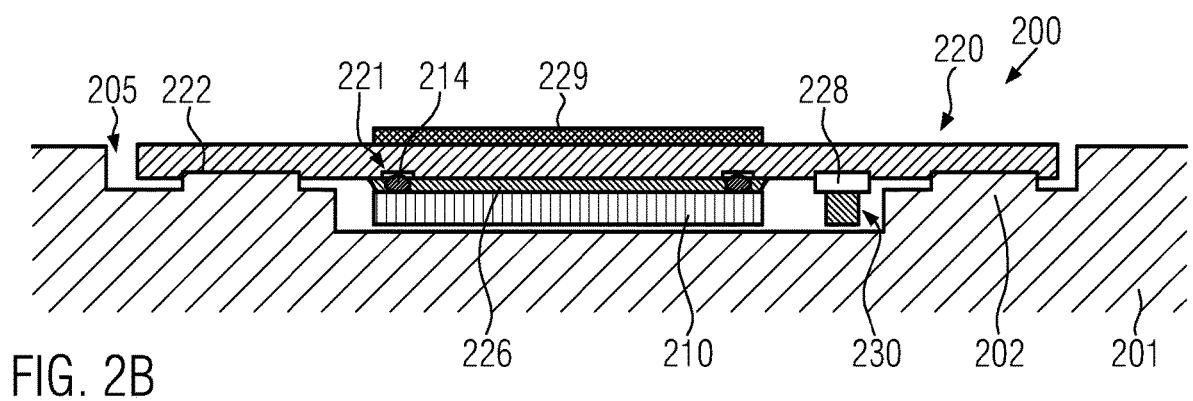

FIG. 2B schematically illustrates a cross-sectional view of the smartcard 200, which may have substantially the same configuration as the smartcard 200 of FIG. 2A, except for contact elements 214, which may be provided in the form of appropriate bump structures, for instance composed of gold, nickel/gold, and the like, as also discussed above in the context of FIG. 1B.

Hence, upon forming the smartcard 200 of FIG. 2B respective solder material may be applied to the contact elements 222, 228, as discussed above. Thereafter, the component 230 may be positioned in pick and place step, with the contact elements 228 connecting to respective contact regions (not shown) of the components 230, and a reflow process may be carried out in order to electrically and mechanically connect the components 230 to the contact elements 228, as also discussed above. Thereafter, the non-conductive or anisotropically conductive material 226 may be provided, for instance by lamination, so as to pre-condition the chip 210 for a subsequent heat treatment in order to reliably mechanically and electrically connect the contact elements 214 to the contact elements 221 after having placed the chip 210 on the substrate 220. As discussed above, the mask layer 229, if provided, may be formed at any appropriate manufacturing stage, for example, prior to attaching the chip 210 to the substrate 222 based on a nonconductive adhesive agent in order to adjust aesthetic and/or functionality of the interaction zone 215.

As a result, the present invention provides smartcards and respective manufacturing techniques, in which a biometric sensor chip may be connected to the card-type substrate of the smartcard in a space efficient manner on the basis of reliable direct electrical and mechanical connections between respective contact elements formed on the chip and first contact elements of a chip receiving substrate, which in turn is connected to the card-type substrate by a direct connection of second contact elements of the chip receiving substrate to respective contact elements of the card-type substrate. In this manner, the sensor chip may be integrated into a card-type substrate with reduced overall thickness, thereby providing for a reliable and flexible way of incorporating biometric capabilities into card-type substrate.

The invention claimed is:

1. A method of adding biometric functionality to a card-type substrate, the method comprising
   providing a biometric chip so as to have a first surface and an opposing second surface, said first surface having formed thereon chip contact elements;
   connecting said biometric chip to a chip receiving substrate by at least one of gluing and soldering said chip contact elements to a corresponding first set of substrate contact elements formed on a contact surface of said chip receiving substrate; and
   connecting said chip receiving substrate to said card-type substrate by at least one of gluing and soldering a second set of substrate contact elements of said chip receiving substrate to card contact elements of said card-type substrate,
   wherein said chip receiving substrate is provided with an opening to expose at least a portion of said first surface of said biometric chip after being connected to said chip-receiving substrate.

2. The method of claim 1, further comprising filling a fill material into said opening so as to cover said at least a portion of said first surface of said biometric chip.

3. The method of claim 2, wherein said fill material is provided so as to form a substantially even surface area that is flush with an outer surface of said card-type substrate.

4. The method of claim 1, wherein said chip receiving substrate is provided so as to entirely cover said biometric chip after connecting said chip receiving substrate to said card-type substrate.

5. The method of claim 4, further comprising forming a mask layer on said chip receiving substrate, wherein said mask layer corresponds in lateral size and position substantially to a lateral size and position of said biometric chip.

6. The method of claim 1, further comprising connecting a discrete functional component to said chip receiving substrate prior to connecting said chip receiving substrate to said card-type substrate.

7. The method of claim 6, further comprising forming at least one of a solder material and a conductive adhesive material for said discrete functional component and for said second set of substrate contacts in a same process sequence.

8. The method of claim 1, wherein any thermal stress and mechanical stress inducing processes for processing said card-type substrate are performed prior to connecting said chip receiving substrate to said card-type substrate.

9. The method of claim 1, comprising
forming the card-type substrate by stacking and laminating a plurality of material layers, said card-type substrate including a plurality of contact elements;
forming a cavity in said card-type substrate so as to expose at least some of said plurality of contact elements and thereby finalize said card-type substrate;
thereafter, adding biometric functionality to said card-type substrate; and
electrically connecting said biometric chip to said at least some of the plurality of contact elements.

10. The method of claim 9, wherein electrically connecting said biometric chip to said at least some of the plurality of contact elements comprises electrically and mechanically connecting chip contact elements formed on a surface of said biometric chip to a first set of contact elements formed on a surface of the chip receiving substrate by at least one of soldering and gluing.

11. The method of claim 10, further comprising electrically and mechanically connecting said at least some of the plurality of contact elements of the card-type substrate to a second set of contact elements formed on said surface of the chip receiving substrate by at least one of soldering and gluing.

12. The method of claim 11, further comprising applying at least one of a solder material and a glue material to said second set of contact elements and to one or more additional contact elements formed on said surface of the chip receiving substrate in a same process.

13. The method of claim 12, further comprising placing at least one discrete electronic component on said one or more additional contact elements of the chip receiving substrate.

14. The method of claim 13, further comprising performing a heat treatment so as to commonly electrically and mechanically connect said at least one discrete functional component and said biometric chip.

15. The method of claim 13, further comprising performing a heat treatment so as to electrically and mechanically connect said at last one discrete functional component prior to positioning said chip receiving substrate.

16. The method of claim 11, wherein connecting said biometric chip to said at least some of the plurality of contact elements comprises: placing said biometric chip in said cavity so as to adhere to said first set of contact elements of the chip receiving substrate, and positioning said biometric chip receiving substrate so as to adhere, with the second set of contact elements, to said at least some of the plurality of contact elements.

17. The method of claim 10, further comprising forming an underfill material on said surface of said chip receiving substrate prior to or after electrically and mechanically connecting said chip contact elements to said first set of contact elements by soldering.

18. The method of claim 13, further comprising filling a fill material into said opening after having connected said chip to said at least some of the plurality of contact elements.

19. A smart card, comprising
a card substrate including a cavity and a plurality of card contact elements provided in said cavity;
a biometric chip positioned in said cavity and including a plurality of chip contact elements; and
a chip receiving substrate including a first set of contact elements and a second set of contact elements formed on a cavity-side surface, said chip receiving substrate covering at least a portion of said cavity,
wherein said plurality of chip contact elements is directly mechanically and electrically connected to said first set of contact elements and said plurality of card contact elements is directly electrically and mechanically connected to said second set of contact elements, and
wherein said chip receiving substrate comprises an opening aligned to a sensor surface portion of said biometric chip.

20. The smart card of claim 19, further comprising one or more discrete functional components positioned in said cavity and being electrically and mechanically connected to one or more additional contact elements of said chip receiving substrate.

21. The smart card of claim 2, further comprising a fill material formed in said opening.

22. The smart card of claim 19, further comprising a mask layer formed on an external surface of said chip receiving surface, wherein said mask layer corresponds in lateral size and shape to a portion of a sensor surface of said biometric chip.

* * * * *